United States Patent [19]

Stevens

[11] 4,181,263

[45] Jan. 1, 1980

[54] METHOD OF PULVERIZING

[75] Inventor: William D. Stevens, North Caldwell, N.J.

[73] Assignee: Foster Wheeler Energy Corporation, Livingston, N.J.

[21] Appl. No.: 944,227

[22] Filed: Sep. 20, 1978

Related U.S. Application Data

[63] Continuation-in-part of Ser. No. 838,620, Oct. 3, 1977, abandoned.

[51] Int. Cl.[2] ........................ B02C 17/06; B02C 17/00

[52] U.S. Cl. ........................................ 241/19; 241/34; 241/54; 241/101.6

[58] Field of Search ........................ 241/19, 24, 34, 47, 241/52, 54, 56, 57, 75, 77, 79, 79.1, 81, 101 B, 101.6, 137, 171; 366/101, 105

[56] References Cited

U.S. PATENT DOCUMENTS

| | | | |
|---|---|---|---|
| 2,189,312 | 2/1940 | Frisch | 241/52 |
| 2,285,429 | 6/1942 | Frisch | 241/54 X |
| 3,032,280 | 5/1962 | Whitney, Jr. et al. | 241/52 |
| 3,189,285 | 6/1965 | Miller | 241/52 X |

*Primary Examiner*—Richard B. Lazarus
*Attorney, Agent, or Firm*—Marvin A. Naigur; John E. Wilson; John J. Herguth, Jr.

[57] ABSTRACT

A method of pulverizing is provided which allows for blending different pulverized solids before passing the pulverized solids to points of use. The method steps of pulverizing a plurality of solids feedstocks in a plurality of pulverizing sections, mixing the pulverized solids, and regulating the rates at which the solids feedstocks are fed to respective pulverizing sections.

6 Claims, 3 Drawing Figures

METHOD OF PULVERIZING

BACKGROUND OF THE INVENTION

This application is a continuation-in-part of my prior application, U.S. Ser. No. 838,620 filed Oct. 3, 1977 and now abandoned.

This invention relates to a method of pulverizing and specifically to a method allowing for blending of different pulverized solids before passing the pulverized solids to points of use.

Pulverizer arrangements are known in which solids such as coal are fed to a rotating drum at each end thereof from different bunkers. The pulverized coal particles are removed from each end by means of a charge of air, and are directed to individual burners. In such an arrangement the quality of the coal going to a particular burner may be different from the quality of coal going to another burner, since the quality of coal coming from different bunkers may vary.

In another known pulverizer arrangement, coal feedstock is fed from a single coal bunker to both ends of a rotating drum. The crushed coal particles are removed from each end of the drum and combined into a single stream before the crushed coal particles are passed to the burners. Such an arrangement does not provide for blending different quality coal from a plurality of bunkers.

In another known pulverizer arrangement coal feedstocks are introduced along with air from both ends of the mill into coaxial rotating chambers. The crushed coal particles are passed along with air into a central coaxial chamber from the two rotating chambers. In this type of arrangement the coal from the different rotating chambers is not passed through a classifier before being combined in the central chamber. Therefore, if the combined coal stream is later passed through a classifier, the blend of the coal feed sent to the burners may fluctuate over time.

The instant invention provides a method of pulverizing solids, such as coal, in which solids feedstocks coming from different bunkers are mixed, and the blend of the mixture is controlled before passing the particulate solids to points of use such as to burners or to storage.

SUMMARY OF THE INVENTION

In accordance with an illustrative embodiment demonstrating features and advantages of the present invention a method of pulverizing is provided which includes the steps of feeding solids feedstocks to first and second pulverizing sections wherein the respective feedstocks are pulverized, passing the pulverized solids through respective classifiers, recycling oversized solids to respective pulverizing sections, mixing the pulverized solids, and regulating the feed rate of the respective solids feedstocks in order to obtain a desired blend of mixed pulverized solids.

BRIEF DESCRIPTION OF THE DRAWINGS

The above brief description, as well as further objects, features and advantages of the present invention will be more fully appreciated by reference to the following detailed description of a presently preferred but nonetheless illustrative embodiment in accordance with the present invention when taken in connection with the accompanying drawings, wherein.

DESCRIPTION OF THE PREFERRED EMBODIMENT

Figure 1:
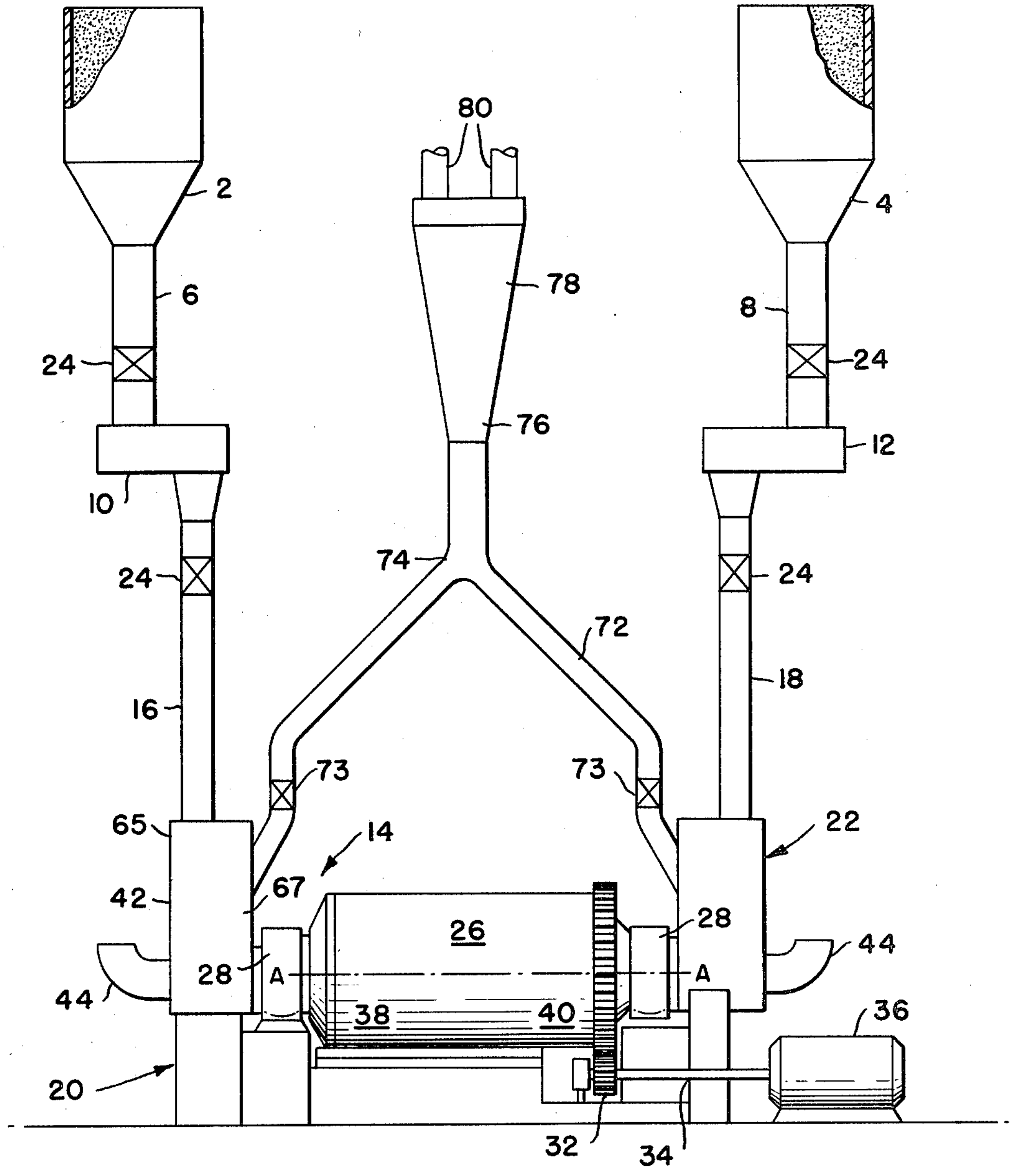
FIG. 1 is an elevational view of the pulverizer arrangement which can be used in practicing the instant invention, showing various conduits, a pulverizer and the means for mixing the different feedstocks.

Referring to FIG. 1 of the drawings, there is shown the pulverizer arrangement which can be used when practicing the instant invention. Solid feedstock such as coal is stored in bunkers 2 and 4. The coal in bunker 2 can be of a different quality from the coal in bunker 4; this difference in quality could be known, or could be mere happenstance. Coal passes through conduits 6, 8 from bunkers 2, 4 respectively to feeders 10, 12 respectively. The feeders 10, 12 are of a known design, and allow for regulating the delivery of coal from the bunkers 2, 4 to pulverizer 14. Conduits 16, 18 connect the feeders 10, 12 respectively to inlet means 20, 22 adjacent the ends of pulverizer 14. Stop valves 24 are disposed in conduits 6, 8, 16 and 18 before and after feeders 10 and 12.

Pulverizer 14 is a double ended ball mill of a known type and consists generally of a rotatable drum 26 mounted at opposite ends on trunnions 28. A large ring gear 30 is mounted on the outside of the drum 26, and engages a drive gear 32 mounted on shaft 34. Shaft 34 is driven by motor 36. When motor 36 is activated, its rotation is translated through shaft 34 to drive gear 32 which, in turn, engages ring gear 30, thereby rotating drum 26 about axis A—A. A plurality of heavy metal balls, not shown, are disposed within drum 26. Adjacent trunnions 28 are pulverizing sections 38, 40. Inlet means 20 is associated with pulverizer section 38 of pulverizer unit 14, and inlet means 22 is associated with opposite pulverizing section 40 of pulverizer unit 14. Inlet means 20, will be described in detail later. After raw coal feedstock is introduced to the drum 26 through inlet means 20, 22, it comes in contact with the metal balls located in each pulverizing section 38, 40. As drum 26 rotates, the balls contained therein move, and the movement of the balls causes them to pulverize the raw coal feedstock into small particles.

Figure 2:
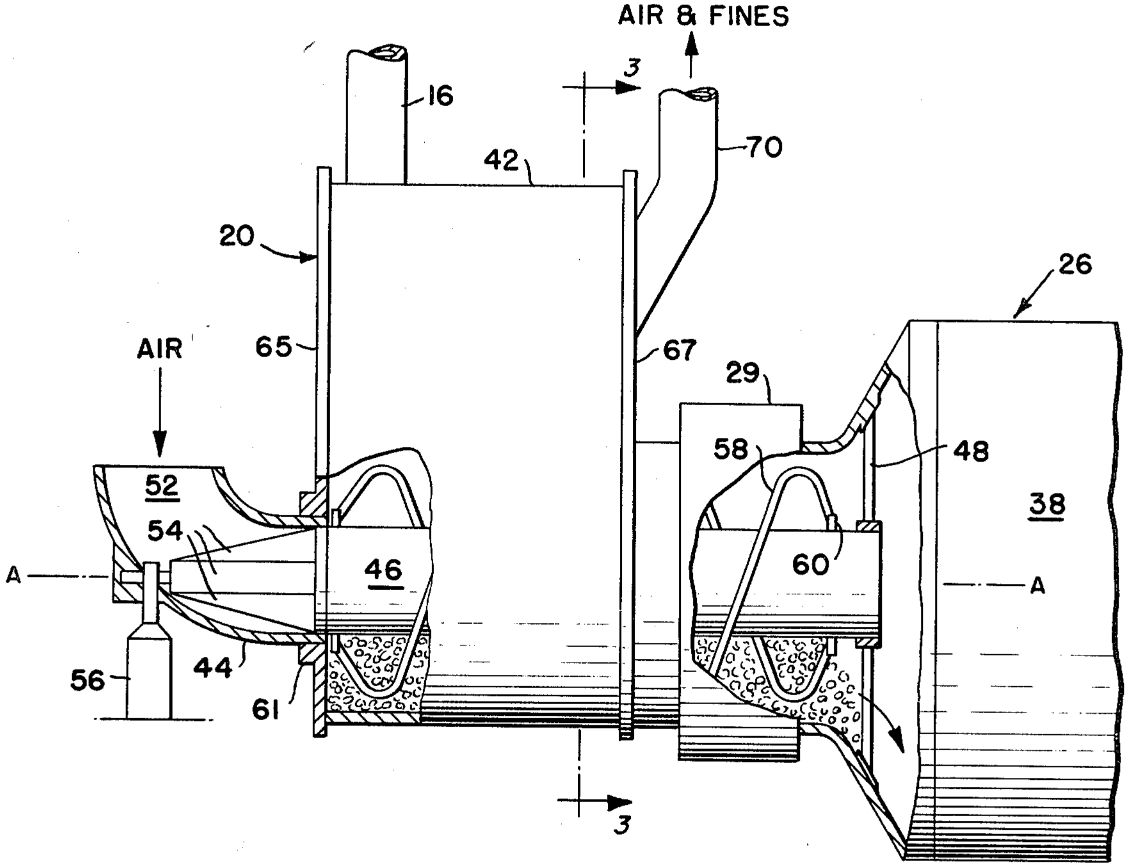
FIG. 2 is an elevational view of an inlet end of the pulverizer showing the means for introducing and removing solids from a pulverizer section which can be used when practicing the invention.

Referring now to FIG. 2, there is shown an elevational view of inlet means 20 associated with pulverizer section 38 of the pulverizer unit 14. Conduit 16 communicates with housing 42 at its top passing through plate 64 between scrolls 66; housing 42 is connected to one end of drum 26. Air inlet duct 44 is attached to housing 42 and communicates with rotatably mounted tube 46. Tube 46 is mounted at one end within drum 26 by spokes 48 which are attached to the inner wall of drum 26. At its other end tube 46 is connected to shaft 52 by means of arms 54. Shaft 52 is rotatably mounted in a bearing assembly 56 for rotation about axis A—A. Metallic ribbons 58 are coiled around the outer periphery of tube 46 and are attached to one end of tube 46 by bars 60, and are attached at their other end to annular plate 61, which is mounted to tube 46 adjacent the end of tube 46 which communicates with duct 44. As drum 26 rotates about axis A—A, the ribbons 58 and tube 46 also rotate about axis A—A. Coal introduced through conduit 16 falls below tube 46, and the motion of ribbons 58 causes the coal to be moved into drum 26 through the open end of drum 26 adjacent trunnion 28. Air introduced to the drum through tube 46 becomes entrained with pulverized coal particles, leaves the drum 26 above tube 46, enters the housing 42, and is thereafter directed through classifier 62, which is shown in FIG. 3.

Figure 3:
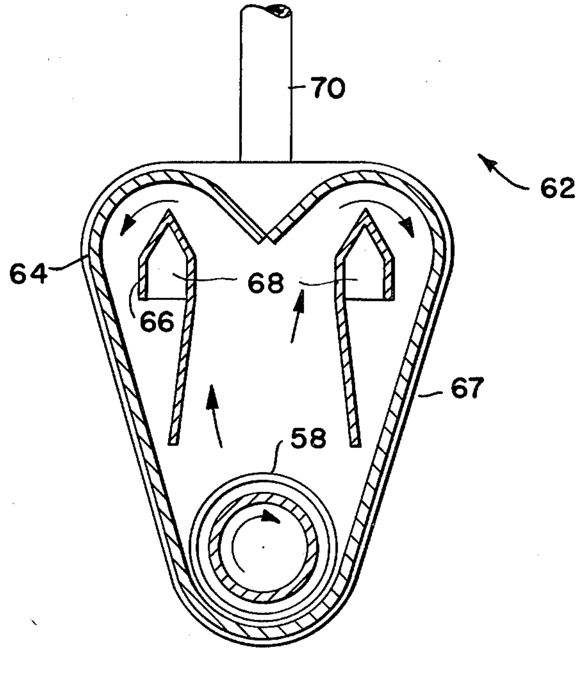
FIG. 3 is a sectional view taken along line 3—3 of FIG. 2 and showing a classifier which can be used when practicing the instant invention.

As shown in FIG. 3, air entrained with coal particles, shown by arrows, rises within housing 42 and is directed through passages defined by plates 64 and scrolls 66. Plates 64 and scrolls 66 extend between walls 65 and 67 of housing 42. Air entrained with fine particulate coal leaves housing 42 through openings 68 formed in wall 67 and passes into conduit 70. Larger particulate coal material falls to the bottom of scrolls 66 and is returned to drum 26 with the incoming raw coal feedstock. While only one inlet means 20 is shown in FIG. 2 and one associated classifier 62 is shown in FIG. 3, it is to be understood that inlet means 22 and an associated classifier are disposed adjacent the other pulverizing section 40 of pulverizing unit 14.

Returning to FIG. 1, air entrained with fine particulate coal is passed through conduit 70 from pulverizer section 38, while air entrained with fine particulate coal is passed through conduit 72 from the other pulverizer section 40 of pulverizing unit 14. Stop valves 73 are disposed in conduits 70, 72. Conduits 70 and 72 meet at Y-section 74, thereby bringing together the air with entrained fine coal particles from both pulverizer sections 38, 40 of unit 14. The fine particulate coal from each pulverizing section is mixed in central conduit 76 as it passes therethrough. From conduit 76 coal is passed to receptacle 78. Upon arriving at receptacle 78 the particulate coal has been thoroughly mixed and a blended coal fuel is available for distribution to points of use. Blended coal is passed through conduits 80, each of which can be connected to individual burners, or to storage bins. By regulating the supply of raw feedstock to the pulverizer sections, as by feeders 10, 12, the blend of the coal fuel can be controlled.

In operation raw coal feedstock is fed from bunkers 2, 4 by means of conduits 6, 8, 16 and 18 and feeders 10, 12 respectively to pulverizer inlets 20, 22. The raw coal feedstock is pulverized in pulverizing sections 38, 40, passed through classifiers 62. Oversized coal is returned to pulverising sections 38, 40, and sufficiently fine pulverized coal is passed through conduits 70, 72. Pulverized coal fines from each pulverizer section are brought together at Y-section 74, mixed in central conduit 76, passed to receptacle 78, and thereafter routed to various burners or to storage by way of conduits 80. By regulating the rate at which feedstock is fed from bunkers 2, 4, such as by means of feeders 10, 12, the blend of the mixture of coal in receptacle 78 can be controlled.

A latitude of modification and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method of pulverizing comprising the steps of:

(a) feeding a first solids feedstock to a first pulverizing section;

(b) feeding a second solids feedstock to a second pulverizing section;

(c) pulverizing said first and second solids feedstocks in said first and second pulverizing sections, respectively;

(d) passing pulverized solids from said first and second pulverizing sections to first and second classifying means respectively for separating of oversized solids out of said pulverized solids;

(e) recycling said separated oversized solids from said first and second classifying means to said first and second pulverizing sections, respectively;

(f) passing said pulverized first and second solids from respective first and second classifying means to mixing means;

(g) mixing said pulverized first and second solids in said mixing means; and (h) regulating the rate of feeding said first and second solids to respective first and second pulverizing sections in order to obtain a desired blend of said mixture of first and second pulverized solids feedstock in said mixing means.

2. The method of claim 1 wherein said steps feeding first and second solids feedstocks to first and second pulverizing sections respectively comprises passing said first solids feedstock to one end of a double ended ball mill and passing said second solids feedstock to the other end of said ball mill.

3. The method of claim 1 wherein said step of passing said pulverized first and second solids to said mixing means comprises passing a first stream of air entrained with pulverized particles of said first solids feedstock and passing a second stream of air entrained with pulverized particles of said second solids feedstock to said mixing means, and wherein said mixing step comprises bringing said first and second streams together in a conduit and passing the resultant stream through said conduit said first and second solids particles mixing with one another as they pass through said conduit.

4. The method of claim 1 wherein said regulating step comprises varying the rate at which said first and said second solids feedstocks are fed to said first and second pulverizing sections respectively.

5. The method of claim 1 wherein said step of feeding first and second solids feedstock to first and second pulverizing sections comprises passing said first solids feedstock to one end of a double ended ball mill and passing said second solids feedstock to the other end of said ball mill; said step of passing said pulverized first and second solids to said mixing means comprises passing first stream of air entrained with pulverized particles of said first solids feedstock and passing a second stream of air entrained with pulverized particles of said second solids feedstock to said mixing means; said step of mixing comprises bringing said streams together in a conduit and passing the resultant stream through said conduit, said first and second solids particles mixing with one another as they pass through said conduit; and said regulating step comprises varying the rate at which said first and second solids feedstocks are fed to said first and second pulverizing sections respectively.

6. A method of pulverizing coal comprises the steps of:

(a) feeding a first coal feedstock to a first pulverizing section;

(b) feeding a second coal feedstock to a second pulverizing section;

(c) pulverizing said first and second coals in said first and second pulverizing sections respectively;

(d) passing pulverized first and second coals from said pulverizing sections to respective classifiers for separation of oversized solids from said respective pulverized coals;

(e) recycling said separated oversized coals from said first and second classifiers to said first and second pulverizing sections respectively;

(f) passing said pulverized first and second coals from said classifiers to a mixing means;

(g) mixing said pulverized first and second coals in said mixing means; and (h) regulating the rate of feeding said first and second coals to said first and second pulverizing sections in order to obtain a desired blend of said first and second coals in said mixture of coals.

* * * * *